United States Patent
Long et al.

(10) Patent No.: US 12,085,178 B2
(45) Date of Patent: Sep. 10, 2024

(54) NON-RETURN CHECK VALVE AND CHECK VALVE APPARATUS FOR VACUUM SYSTEM

(71) Applicant: Edwards Limited, Burgess Hill (GB)

(72) Inventors: Cainan Long, Burgess Hill (GB); Ian David Stones, Burgess Hill (GB); Phillip North, Burgess Hill (GB); Clifford George Burt, Burgess Hill (GB); Robin Hockley, Burgess Hill (GB); Konstantinos Karoulas, Burgess Hill (GB)

(73) Assignee: Edwards Limited

( * ) Notice: Subject to any disclaimer, the term of this patent is extended or adjusted under 35 U.S.C. 154(b) by 0 days.

(21) Appl. No.: 18/041,139

(22) PCT Filed: Aug. 12, 2021

(86) PCT No.: PCT/GB2021/052087
§ 371 (c)(1),
(2) Date: Feb. 9, 2023

(87) PCT Pub. No.: WO2022/034324
PCT Pub. Date: Feb. 17, 2022

(65) Prior Publication Data
US 2023/0296183 A1    Sep. 21, 2023

(30) Foreign Application Priority Data
Aug. 13, 2020  (GB) ...................................... 2012603

(51) Int. Cl.
*F16K 15/04* (2006.01)
*F16K 17/12* (2006.01)
*F16K 25/00* (2006.01)

(52) U.S. Cl.
CPC ............ *F16K 15/042* (2013.01); *F16K 17/12* (2013.01); *F16K 25/005* (2013.01); *F16K 2200/204* (2021.08)

(58) Field of Classification Search
CPC ..... F16K 15/042; F16K 11/076; F16K 27/065
See application file for complete search history.

(56) References Cited

U.S. PATENT DOCUMENTS 841,474 A * 1/1907 Wendelken ........... F16K 15/026
                                                    137/515.5
4,263,936 A * 4/1981 Brown .................... F16K 15/04
                                                    137/496

(Continued)

FOREIGN PATENT DOCUMENTS

DE    102009015528 A1    10/2010
DE    102018214524 A1    3/2020

(Continued)

OTHER PUBLICATIONS

British Examination Report dated Nov. 11, 2020 and Search Report dated Nov. 10, 2020 for corresponding British Application No. GB2012603.3, 5 pages.

(Continued)

*Primary Examiner* — Kevin R Barss
(74) *Attorney, Agent, or Firm* — Theodore M. Magee; Westman, Champlin & Koehler, P.A.

(57) ABSTRACT

A vacuum system non-return valve includes a baffle for extending across a flow path in the vacuum system and a valve member. The baffle has an aperture, a perimeter of the aperture has a valve seat. The valve member has a curved sealing surface configured to mate with the valve seat. The valve member and aperture are configured such that the valve member obscures the aperture and seals with the valve seat to impede a flow of fluid in a closed position and is displaceable in use to move away from the valve seat and (Continued)

allow a fluid flow in an open position; at least a portion of the surface of the baffle surrounding the aperture slopes towards the inlet end of the valve such that the aperture is smaller at the inlet end than it is at the outlet end.

12 Claims, 4 Drawing Sheets

(56) References Cited

U.S. PATENT DOCUMENTS

| | | | |
|---|---|---|---|
| 4,674,529 A | | 6/1987 | Ferguson |
| 5,509,445 A | | 4/1996 | Couet |
| 6,510,869 B1 * | | 1/2003 | Ouchi ............... F16K 15/04 137/533.15 |
| 10,779,434 B2 * | | 9/2020 | Chang ............... H05K 7/20145 |
| 2004/0173312 A1 | | 9/2004 | Shibayama et al. |
| 2005/0133095 A1 | | 6/2005 | Nogle |
| 2006/0192168 A1 | | 8/2006 | Thompson |
| 2007/0068580 A1 | | 3/2007 | Van Der Linden et al. |
| 2019/0048870 A1 | | 2/2019 | Gaertner et al. |

FOREIGN PATENT DOCUMENTS

| | | |
|---|---|---|
| JP | S62-4668 A | 1/1987 |
| JP | H10-9151 A | 1/1998 |
| JP | 2019-507843 A | 3/2019 |

OTHER PUBLICATIONS

PCT Notification of Transmittal of the International Search Report and the Written Opinion of the International Searching Authority, or the Declaration and PCT Search Report dated Nov. 22, 2021 for corresponding PCT application Serial No. PCT/GB2021/052087, 7 pages.
PCT Written Opinion dated Nov. 22, 2021 for corresponding PCT Application Serial No. PCT/GB2021/052087, 5 pages.
PCT Written Opinion dated Aug. 18, 2022 for corresponding PCT application Serial No. PCT/GB2021/052087, 5 pages.
Response to Written Opinion dated Sep. 6, 2022 for corresponding PCT application Serial No. PCT/GB2021/052087, 1 page.
Japanese Notice of Reason for Rejection dated Mar. 29, 2024 for corresponding Japanese application Serial No. JP2023-509419, 4 pages.

* cited by examiner

NON-RETURN CHECK VALVE AND CHECK VALVE APPARATUS FOR VACUUM SYSTEM

CROSS-REFERENCE OF RELATED APPLICATION

This application is a Section 371 National Stage Application of International Application No. PCT/GB2021/052087, filed Aug. 12, 2021, and published as WO 2022/034324A1 on Feb. 17, 2022, the content of which is hereby incorporated by reference in its entirety and which claims priority of British Application No. 2012603.3, filed Aug. 13, 2020.

FIELD

The field of the invention relates to non-return valves for use in vacuum systems.

BACKGROUND

Non-return valves are used in vacuum systems to allow fluid to be pumped in one direction and to resist the return of the fluid from a higher pressure region to the vacuum region. They are used for example as internal pressure relief valves such as blow-off valves, or as exhaust check valves in dry pumps, or as non-return valves in abatement systems. The pressure differences found within vacuum systems can be high and these require effective seals.

For applications with harsh thermal and chemical conditions, such as semiconductor applications, the processing chamber often contains strong acid/alkali gases, with solid and condensable by-products. The usage of check valves containing elastomers, which materials are commonly used for sealing in such valves, becomes increasingly limited by the higher pump and pipe operation temperature requirements, especially within corrosive environments.

It would be desirable to provide an improved non-return valve that has resistance to corrosive and hot process gases and provides an effective seal.

The discussion above is merely provided for general background information and is not intended to be used as an aid in determining the scope of the claimed subject matter. The claimed subject matter is not limited to implementations that solve any or all disadvantages noted in the background.

SUMMARY

An aspect provides a vacuum system non-return valve comprising: a baffle for extending across a flow path in said vacuum system, said baffle comprising an aperture, a perimeter of said aperture comprising a valve seat; a valve member comprising a curved sealing surface configured to mate with said valve seat, said valve member and aperture being configured such that said valve member obscures said aperture and seals with said valve seat to impede a flow of fluid from an outlet end to an inlet end in a closed position and is displaceable in use to move away from said valve seat and allow a fluid flow from said inlet end to said outlet end in an open position; at least a portion of said surface of said baffle surrounding said aperture slopes inwardly towards said inlet end of said valve such that said aperture is smaller at said inlet end than it is at said outlet end; and wherein diametrically opposing portions of said sloped surfaces of said aperture subtend an angle of between 30° and 70°.

It has been found that a sloped surface around the aperture of the valve can provide an effective seal with the curved surface of the valve member and in particular angles of between 30° and 55°, in some embodiments between 30° and 45° have been found to receive the valve member securely, robustly and provide effective sealing. In other cases an angle of between 45° and 55° in some cases 45° and 100° has been found to be effective.

The inventors of the present invention recognised that where compressible elastomer type materials were not available for sealing it is particularly important that the sealing surfaces have a good contact if the seal is to be effective. Furthermore, if the valve is to be displaced continually its orientation may change slightly each time it is displaced and thus, it is also advantageous if the available sealing surface is not localised to a particular orientation. A valve with a curved surface and a sloped valve seat provides an effective sealing surface and allows the valve member to seal effectively with the valve member in different orientations. In this regard, although it might seem advantageous for the valve seat to have a curved cross section that corresponds to the curved cross section of the valve member, it has been found that for ease of manufacture and to limit the effect that deformation has on sealing properties a sloped, preferably conical valve seat is effective.

The angle of the slope, and relative sizes of the aperture and valve member are selected so that the slope of the surface at the valve seat is tangential to the curved surface of the valve member at the desired mating position. In this regard where the valve seat and valve member are selected to have a similar diameter, then the valve member mates with the valve seat at a point closest to the widest part of the valve member where the slope of the valve member surface is steep, and in such a case the appropriate angle is a smaller angle. Having the valve member of a similar but slightly larger diameter than the valve seat has some advantages as it allows for a wider diameter valve seat and thus, improved conductance. However, it has been found that in a vacuum system a smaller angle means that initial displacement of the valve member provides a narrow opening that increases gradually due to the steep slope of the valve seat. This gradual opening regulates changes in the back pressure in the system, providing a gradual change in pressure and reduces any tendency of the ball to bounce in and out of the valve seat by reducing the initial leakage rate of gas through the valve. This allows for improved performance of the vacuum system and reduced wear on the valve when compared to a vacuum system with a check valve with a wider angled valve seat.

In some embodiments said valve member is made of metal and in other embodiments of a ceramic.

In some embodiments, said valve member is made of stainless steel and in some embodiments said valve seat is made of stainless steel.

Stainless seal is robust, hard, resistant to high temperatures and provides an effective sealing surface.

In some embodiments said valve member is made of a different metal to said valve seat, in some embodiments said valve member comprises a nickel-chromium-molybdenum alloy, in some cases Hastelloy C276® (Nickel 57%. Mo 15-17%, Cr 14.5-16.5%, Fe 4-7%).

Forming the valve seat and valve member from different metals, may help to inhibit bonding between the two at high temperatures. A nickel-chromium-molybdenum alloy such as Hastelloy C276® is a particularly good choice for the valve member being resistant to harsh environments and high temperatures.

The configuration of the valve allows for effective sealing without the requirement for compressible elastomeric materials which may degrade at higher temperatures and in corrosive environments. This allows materials such as metals to be used, which materials are robust and resistant to many harsh environments.

In some embodiments, said sloped portion of said surface surrounding said aperture extends from a surface facing said outlet end of said valve towards said surface facing said inlet end and becomes steeper for a portion extending to said surface facing said inlet end, said valve seat being at a location at or close to a change in said angle of slope.

In some embodiments, the angle of the slope becomes steeper towards the inlet end and this allows the location of the valve seat to be close to the area where it becomes steeper and away from the edge of the aperture of the inlet side. This makes for a more robust valve seat where the valve seat portion that is supporting the valve member is not close to the edge of the aperture.

In some embodiments, the material forming said valve seat has a roughness of between 0.1 and 1.0 Ra, preferably between 0.3 and 0.5 Ra.

In some embodiments, the material forming said valve member has a roughness of between 0.01 to 0.5 Ra.

The roughness of the valve member and valve seat have an effect on the quality of the seal and where the valve member and valve seat are made of metal rather than a more resilient material, this effect can be particularly important. It has been found that roughness of between 0.1 and 1.0 Ra, preferably between 0.3 and 0.5 Ra provides an effective surface for the valve seat and an effective seal. Furthermore, such a surface can be produced in a cost effective manner. It may be advantageous if the valve member is formed to be smoother than the valve seat.

An alternative embodiment provides an indent in the sloped surface of the aperture and this indent provides an area that does not contact the curved surface of the valve member such that the valve member contacts the valve seat at two positions on either side of the indent. This can be particularly effective at sealing in effect providing two sealing locations.

In some embodiments, said valve member is solid, while in other embodiments said valve member is hollow. The valve member may be formed of a number of materials and may be hollow or solid and is generally configured to have a certain mass, the mass being selected to provide appropriate protection against reverse flow of gasses while not being too large such that there it creates a significant back pressure on the vacuum system.

In some embodiments, the valve comprises a protrusion extending from said curved surface of said valve member, said protrusion extending through said aperture and comprising a retaining portion extending outwardly from said protrusion and configured to limit the travel of the valve member towards said outlet end when said valve is in said open position.

The valve member should be retained within the valve, and this may be done using a cage type mechanism for limiting the travel of the member towards the outlet, alternatively it may be done by a protrusion extending through the aperture and a retaining portion extending from the protrusion that is wider than the aperture.

In some embodiments the baffle may extend across a pipe and where a cage type mechanism is used this may also extend across the pipe and in some embodiments be retained within the pipe as an interference fit.

A further aspect provides a vacuum system non-return valve apparatus comprising two vacuum system non-return valves according to an aspect arranged in series with respect to each other, such that fluid from an inlet end of said valve apparatus flows through a first of said non-return valves and then through a second of said non-return valves.

The non-return valves of embodiments may be used as a double check valve to provide additional protection against backflow. A check valve provides a possible leakage path for gas from the higher pressure outside of the vacuum system into the vacuum system. This can be particularly problematic for valves where conventional elastomer sealing means are not used due to the harsh conditions experienced. The leakage rate depends on the pressure differential across the valve. A double check valve has an intermediate volume between two check valves and this volume is at an intermediate pressure when the valves are closed, such that the pressure drop across each valve is smaller than it would be across a single valve. This results in a lower leakage rate for each of the check valves and thus, for the combined valve than would be the case were a single valve were used.

In some embodiments, the system further comprises an intermediate volume providing a flow path between said two valve seats, a length of said flow path being between 1.5 and 10 times a diameter of said valve seats, preferably between 1.5 and 6 times.

In order for the double check valve to be particularly effective there should be a volume between the two valves such that the pressure differential between the vacuum system and the outside is split across the two check valves. The smaller the intermediate volume the quicker the pressure in the intermediate volume reaches an equilibrium steady state value when the valves close. However, the volume should be sufficient to allow each valve to open and close without physically impacting the other valve.

In some embodiments, said intermediate volume is within a pipe connecting said first and second intermediate valves.

In some embodiments, the two check valves may be independent units and may be connected by a connecting pipe. The length of the connecting pipe is selected to provide a suitable intermediate volume. In some cases, the diameter of the valve seat is between 1.5 and 10 times the lengths of the pipe between the two valve seats of the two valves.

In other embodiments, the apparatus comprises a combined outer housing for housing both said first and second check valves.

It may be advantageous for the double check valve to be formed in a single housing which may be attached to the apparatus thereby requiring fewer sealing means. As has been noted before in corrosive and hot environments sealing means deteriorate and thus, reducing the requirement for sealing means is advantageous.

In some embodiments, said combined outer housing is configured such that a flow path between said check valves comprises a portion running in an opposite direction to a flow path in and out of said valve apparatus.

The combined housing may be configured such that the two check valves are arranged in effect side by side such that the flow path between them changes direction as it goes out of one valve and back down towards the second valve. The direction of the gas flow in and gas flow out may be a single direction the direction of flow simply changing as it passes between the valves in the check valve.

Further particular and preferred aspects are set out in the accompanying independent and dependent claims. Features of the dependent claims may be combined with features of the independent claims as appropriate, and in combinations other than those explicitly set out in the claims.

The Summary is provided to introduce a selection of concepts in a simplified form that are further described in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention will now be described further, with reference to the accompanying drawings, in which.

DETAILED DESCRIPTION

Before discussing the embodiments in any more detail, first an overview will be provided.

For applications with harsh thermal and chemical challenges (e.g. semiconductor applications) a hot pump combined with a check valve that can be used at high temperatures with good corrosive resistance is desirable. Embodiments provide a check valve that may be made completely of metal which shows good sealing performance. In some embodiments, stainless steel is used, the stainless steel of the valve seat being machined to have a surface roughness of between 0.1 and 1 Ra, preferably between 0.3 and 0.5 Ra. In some embodiments the valve member is machined to have a surface roughness of between 0.01 and 0.5 Ra. In some embodiments the valve member is formed of a different metal to the valve seat in some embodiments it is formed of a nickel-chromium-molybdenum alloy. In some embodiments sealing is further improved with the use of a double check valve.

Embodiments provide a check-valve with a valve member having a curved surface abutting a sloped valve seat. The angle of the slope of the valve seat is selected in conjunction with the size of the valve member and aperture to provide effective sealing. In some embodiments, the valve member comprises a ball of diameter 30 mm. The inner diameter for the valve seat is 26 mm. The contact between the ball and the seat is a single line contact. In some embodiments the valve is a metal valve while in others the valve body and seat may be formed of a ceramic. Metals and ceramic are suitable for high temperature and corrosive environment In some embodiments the valve member and seat are formed of the same material, while in others they are formed of different materials.

In some embodiments the valve is mounted within the pipes of the system, while in others a pipe connector is used.

Figure 1:
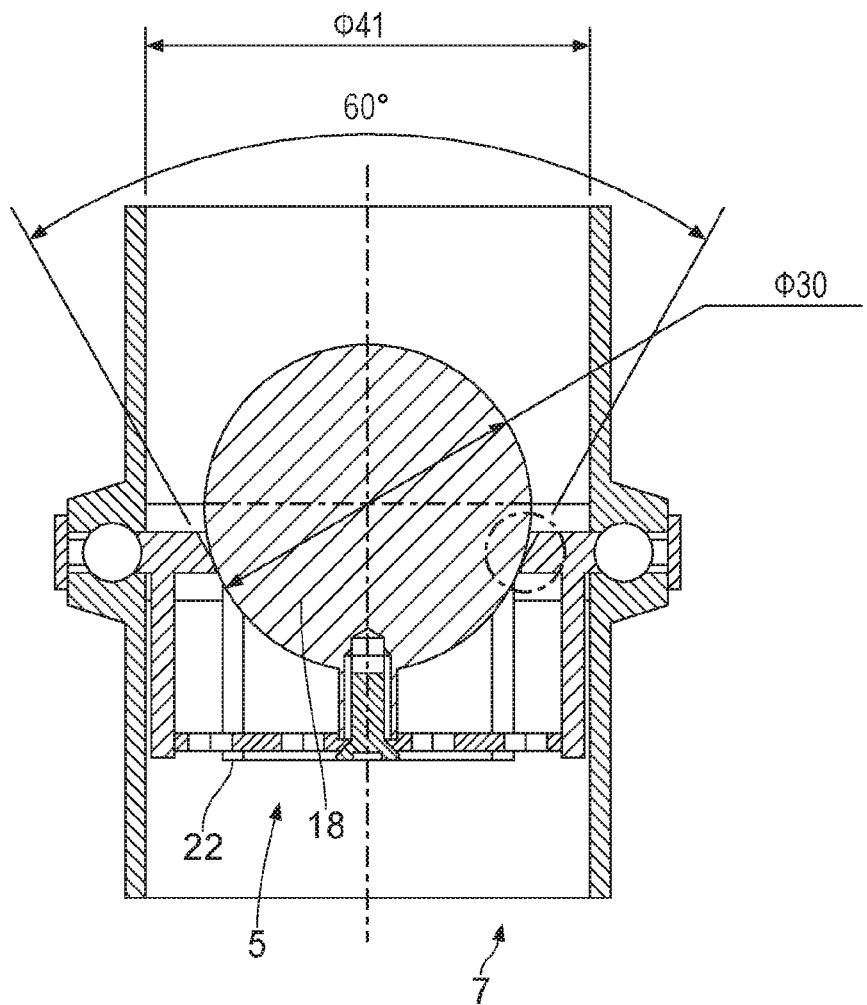
FIG. 1 schematically shows a non-return check valve according to a first embodiment.
Figure 1:
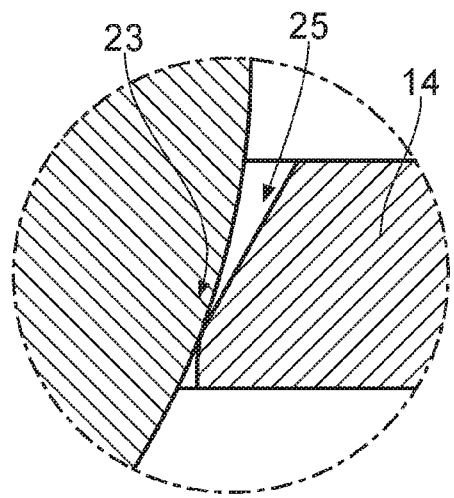

FIG. 1 shows a section through a check valve 5 according to an embodiment. Check valve 5 comprises a valve member 18 in the form of a ball and from which there extends a protrusion and retaining member 22. The retaining member being perforated to allow gas to pass through it. The valve member 18 mates with a valve seat 22 formed in a baffle 14 which extends across the pipe in which the valve is mounted and which comprises an aperture having a sloped surface 25 of a first angle and a more steeply sloped surface. The valve seat 22 being located close to the change in angle of the slopes.

The check valve 5 is mounted via seals within a pipe and gas flows in the direction of arrow 7 from a vacuum system towards an outlet. When the pressure in the vacuum system rises a force is exerted on valve member 18 which is pushed off valve seat 23 into an open position in which position gas can flow through the aperture which is no longer obscured by valve member 18 and out through the top of the pipe. When the pressure within the system falls then the valve body 18 will return to the aperture under its weight and will seal with valve seat 23 such that gas at a higher pressure outside of the vacuum system may not enter the vacuum system.

The aperture in baffle 14 has a sloped surface 25 adjacent to the outlet which subtends an angle of 60° with a sloped surface on the diametrically opposing side of the aperture and this provides a suitable slope for mating with the curved surface of the ball and providing a good seal. The slope becomes steeper towards the inlet of the valve such that the position of the valve seat is well defined and not towards one end of the sloping surface allowing the ball to be held securely and the valve seat not to be easily damaged.

Although the angle of 60° has been found to be effective for valve members where the diameter of the ball is close to the diameter of the valve seat. In some embodiments perhaps where the diameter of the ball is between 5 and 18% larger than the diameter of the aperture preferably between 5 and 10% larger a smaller angle of between 35 and 40° may be preferred. With this angle displacement of the ball from the valve seat provides an initially narrow channel and thus, a gradual more controlled change in pressure.

Figure 2:
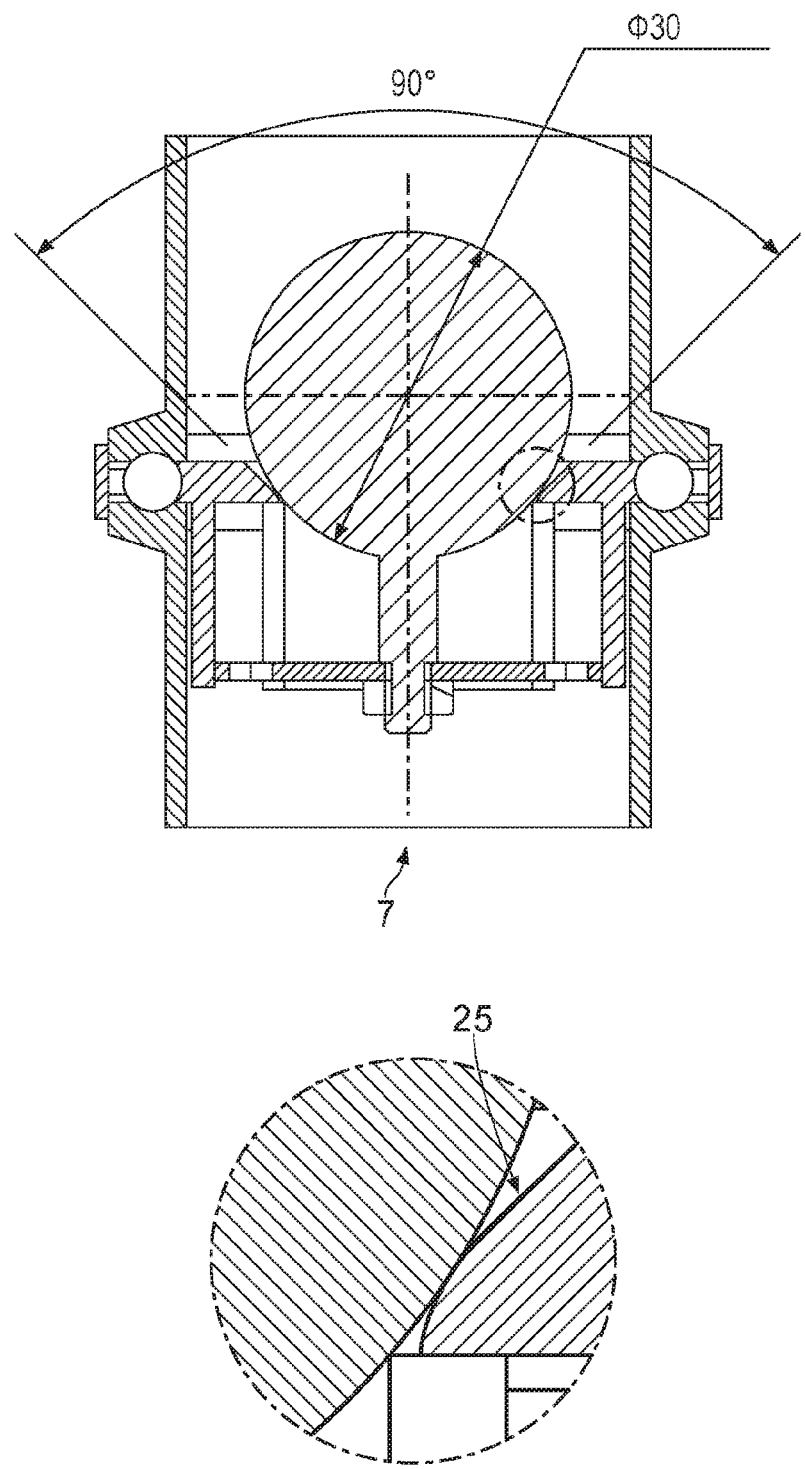
FIG. 2 schematically shows a non-return check valve with a wider angled slope.

FIG. 2 shows an alternative where the angle of the sloping surface 25 is a less steep angle and in this embodiment subtends an angle of 90° with the sloping surface on the diametrically opposed side of the aperture. As in the previous embodiment the slope gets steeper towards the inlet such that the vale seat is in a defined place on the surface. In this example, the diameter of the valve member and the diameter of the seat are more different such that the valve member is held at a position that is not close to the middle of the valve member and thus, the sloping angle of the curved surface is shallower and matches the slope of the valve seat. In this embodiment, the diameter of the ball is between 15 and 30% larger than the diameter of the valve seat. Here the displacement of the valve member causes a greater initial change in fluid flow and may cause poorer performance in the pumping of the vacuum system when compared to a valve seat with a steeper angle.

Figure 3:
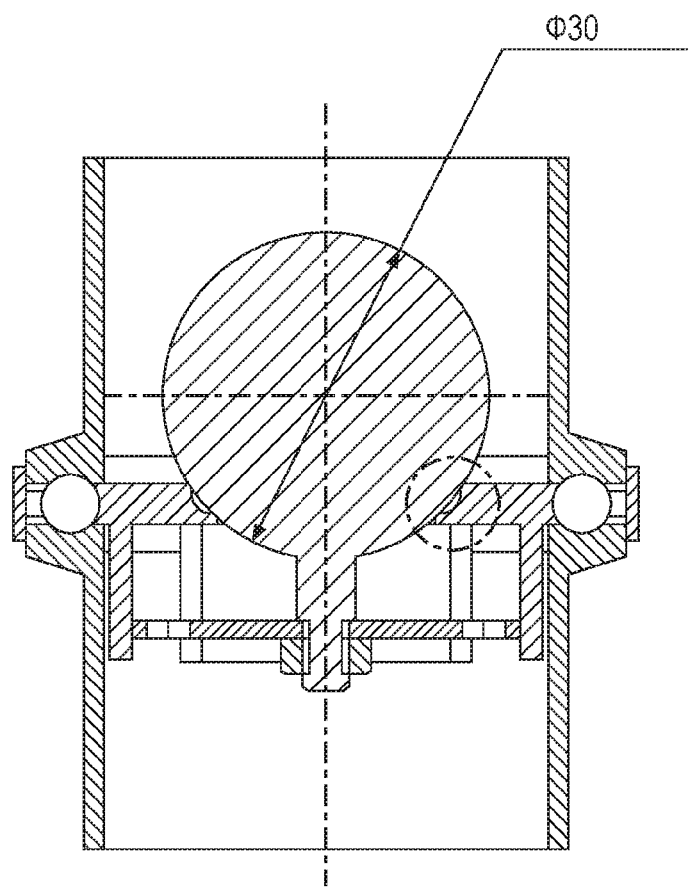
FIG. 3 schematically shows a non-return check valve according to a further embodiment.
Figure 3:
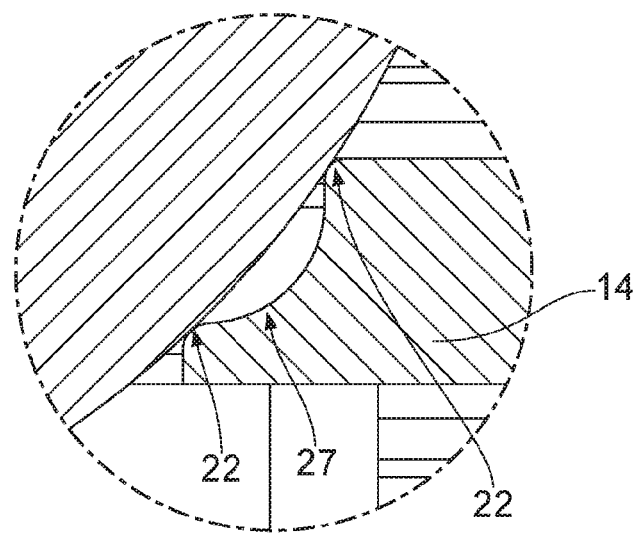

FIG. 3 shows an alternative embodiment where the profile of the surface of the aperture that forms the valve seat has an indent 27 within it such that two valve seats 22 are formed on either side of the indent. The inlet side of the aperture is smaller than the outlet side such that the valve member is held at both points and an effective seal is made at two points leading to better sealing.

Figure 4:
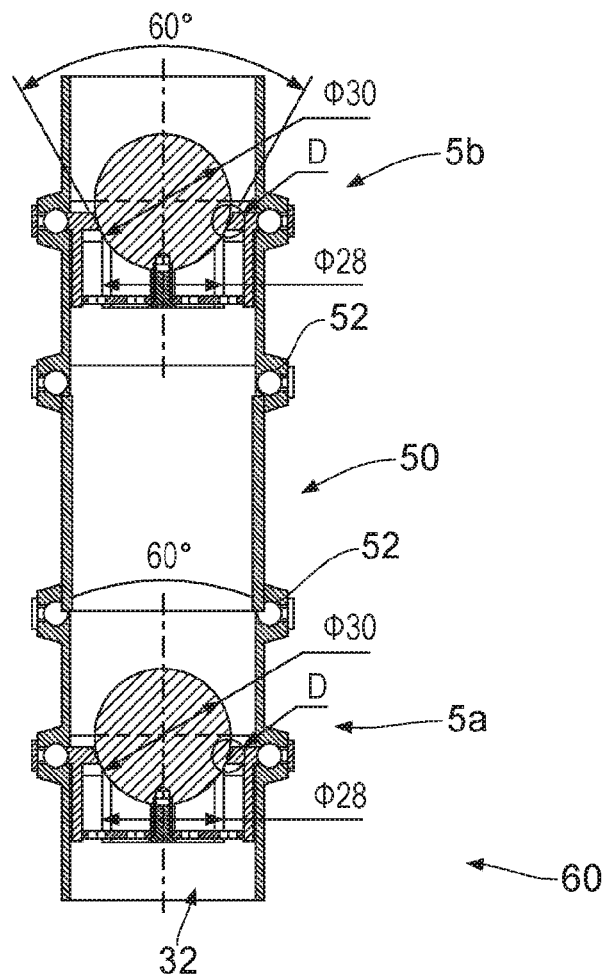
FIG. 4 shows a double check valve according to an embodiment.

FIG. 4 shows an alternative embodiment where a double check valve 60 is provided using two check valves 5a and 5b of the previous embodiments. The two check valves form a double check valve and gas enters via inlet 32 and meets the first check valve 5a. If the pressure at inlet 32 rises to above the pressure within the intermediate volume within pipe 50 the first valve 5a will open and gas will enter the intermediate volume in the pipe 50. An increase in pressure here will cause second valve 5b to open and gas will flow out of the system. When the pressure at the inlet falls below that of the pressure within the intermediate volume 50 then the check valve 5*a* will close. Similarly if the pressure in the intermediate volume falls below that of the outside then the second valve 5*b* will close. In a vacuum system when the pump is started this will cause the pressure below 5*a* to increase and 5*a* will open. The pressure at the inlet of the pump is reduced (vacuum) but at the pump outlet the pressure increases due to the compression of the gas. The pressure in intermediate volume 50 will increase and 5*b* will open. Whilst the pump is operating then usually there is enough gas flow to maintain the pressure differentials and keep 5*a* and 5*b* open.

Stopping the pump will cause the pressure below 5*a* to drop and it will not sustain the weight of 5*a* and it will close, similarly the pressure at 50 will drop and 5*b* will close.

The intermediate volume within pipe 50 is at an intermediate pressure when the two check valves are closed such that the pressure drop between the inlet 32 and outside is split across each of the different check valves which reduces the back leakage. In this regard the leakage across each valve depends upon the pressure drop across the valve, thus, reducing the pressure drop by splitting it between two valves reduces the leakage. The intermediate volume should be selected to be sufficient for the two valves not to physically impact each other during operation, but preferably not significantly larger than this. A larger intermediate volume increases the time for the intermediate volume to reach an equilibrium intermediate pressure when the double check valve closes and this impacts on the vacuum system that the check valve is attached to.

Figure 5:
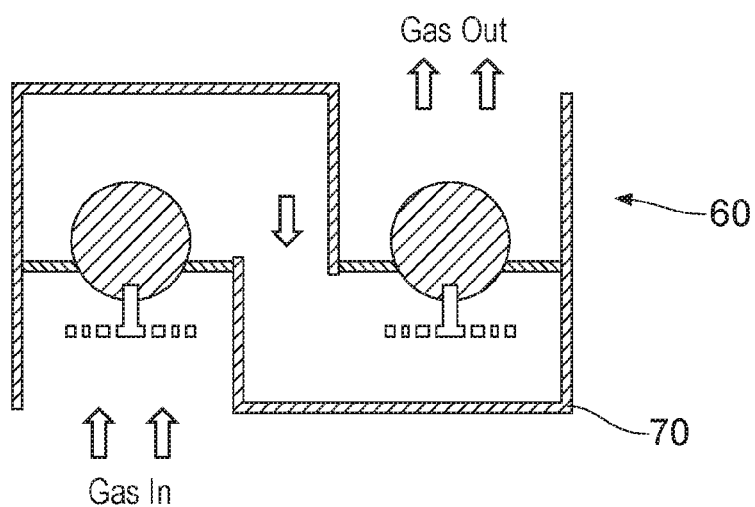
FIG. 5 shows an alternative embodiment of a double check valve.

FIG. 5 shows an alternative embodiment where double check valve 60 is mounted within a single housing 70. Having a single housing makes a valve easier to mount to a system and also reduces the number of seals required to seal it to the system. As has been noted earlier, seals to high temperature corrosive systems can be problematic and reducing the number that is required can be advantageous.

This embodiment provides a particularly compact check valve that can fit into a small space. The two check valves are mounted side by side and this requires the gas flow to change direction as it travels through the valve.

Although the double check valve is shown with a valve member comprising a protrusion and retaining member 22, it may be used with a curved valve member and some other retaining means such as a grid or cage between the valve member and the outlet.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A vacuum system non-return valve comprising:
   a baffle for extending across a flow path in said vacuum system, said baffle comprising an aperture, a perimeter of said aperture comprising a valve seat;
   a valve member comprising a curved sealing surface configured to mate with said valve seat, said valve member and aperture being configured such that said valve member obscures said aperture and seals with said valve seat to impede a flow of fluid from an outlet end to an inlet end in a closed position and is displaceable in use to move away from said valve seat and allow a fluid flow from said inlet end to said outlet end in an open position;
   at least a portion of a surface of said baffle surrounding said aperture slopes inwardly towards said inlet end of said valve such that said aperture is smaller at said inlet end than it is at said outlet end;
   wherein
   diametrically opposing portions of said sloped surfaces of said aperture subtend an angle of between 30° and 70°; and
   wherein the angle of the sloped surface and the relative sizes of the aperture and valve member are selected so that the sloped surface at the valve seat is tangential to the curved sealing surface of the valve member.

2. The vacuum system non-return valve according to claim 1, wherein said diametrically opposing portions of said sloped surfaces of said aperture subtend an angle of between 30° and 55°.

3. The vacuum system non-return valve according to claim 1, wherein said diametrically opposing portions of said sloped surfaces of said aperture subtend an angle of between 30° and 45°.

4. The vacuum system non-return valve according to claim 1, wherein a material forming said valve member has a roughness of between 0.01 and 0.5 Ra.

5. The vacuum system non-return valve according to claim 1, wherein a material forming said valve seat has a roughness of between 0.1 and 1.0 Ra.

6. A The vacuum system non-return valve according to claim 1, wherein said valve member and said valve seat are formed of stainless steel.

7. The vacuum system non-return valve according to claim 1, wherein said valve member and said valve seat are formed of different metals.

8. The vacuum system non-return valve according to claim 1, wherein said sloped portion of said surface surrounding said aperture extends from a surface facing said outlet end of said valve towards said surface facing said inlet end and becomes steeper for a portion extending to said surface facing said inlet end, said valve seat being at a location at or close to a change in said angle of slope.

9. The vacuum system non-return valve according to claim 1, wherein the non-return check valve is made completely of metal.

10. The vacuum system non-return valve according to claim 1, further comprising a cage type mechanism for retaining the valve member within the valve, wherein the cage type mechanism limits travel of the valve member towards the outlet end of the valve.

11. A pipe comprising the vacuum system non-return valve of claim 10, wherein the baffle and the cage type mechanism extend across the pipe.

12. The pipe of claim 11, wherein the cage type mechanism is retained within the pipe as an interference fit.

\* \* \* \* \*